(12) United States Patent
Feshali et al.

(10) Patent No.: US 11,846,805 B2
(45) Date of Patent: Dec. 19, 2023

(54) INTEGRATED PHOTONICS OPTICAL GYROSCOPES WITH IMPROVED SENSITIVITY UTILIZING HIGH DENSITY SILICON NITRIDE WAVEGUIDES

(71) Applicant: Anello Photonics, Inc., Santa Clara, CA (US)

(72) Inventors: Avi Feshali, Los Angeles, CA (US); Mario Paniccia, Santa Clara, CA (US); Warren Bruce Jin, Goleta, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/942,840

(22) Filed: Sep. 12, 2022

(65) Prior Publication Data

US 2023/0185023 A1   Jun. 15, 2023

Related U.S. Application Data

(62) Division of application No. 17/364,279, filed on Jun. 30, 2021, now Pat. No. 11,442,226.

(60) Provisional application No. 63/047,175, filed on Jul. 1, 2020.

(51) Int. Cl.
| | |
|---|---|
| G02B 6/12 | (2006.01) |
| G02B 6/28 | (2006.01) |
| G02B 6/26 | (2006.01) |
| G02B 6/42 | (2006.01) |
| G02B 6/125 | (2006.01) |
| G01C 19/72 | (2006.01) |
| G02B 6/122 | (2006.01) |

(52) U.S. Cl.
CPC ............ *G02B 6/125* (2013.01); *G01C 19/72* (2013.01); *G02B 6/1225* (2013.01); *G02B 2006/12107* (2013.01); *G02B 2006/12138* (2013.01)

(58) Field of Classification Search
CPC ........ G02B 6/13; G02B 6/125; G02B 6/1225; G02B 6/12004; G02B 2006/12107; G02B 2006/12121; G02B 2006/12123; G02B 2006/12138; G01C 19/72
USPC ........ 385/2, 3, 8, 12–14, 24, 28, 32, 49, 50, 385/129–132; 356/149, 460
See application file for complete search history.

(56) References Cited

U.S. PATENT DOCUMENTS

| | | | |
|---|---|---|---|
| 4,904,863 A | 2/1990 | McDearmon | |
| 5,239,362 A * | 8/1993 | Kajioka | ................ G01C 19/72 385/39 |
| 6,163,632 A | 12/2000 | Rickman et al. | |

(Continued)

OTHER PUBLICATIONS

PCT International Search Report and Written Opinion for International Application No. PCT/US2021/040154 dated Oct. 19, 2021, 8 pages.

*Primary Examiner* — Kaveh C Kianni
*Assistant Examiner* — Hung Q Lam
(74) *Attorney, Agent, or Firm* — Lowenstein Sandler LLP; Madhumita Datta

(57) ABSTRACT

Aspects of the present disclosure are directed to structural modifications introduced in a waveguide structure in order to more tightly pack adjacent waveguide turns in an optical gyroscope fabricated on a planar silicon platform as a photonic integrated circuit. Increasing number of turns of the gyroscope coil increases total waveguide length as well as enclosed area of the gyroscope loop, which translates to increased sensitivity to rotational measurement.

15 Claims, 6 Drawing Sheets

(56) References Cited

U.S. PATENT DOCUMENTS

| | | |
|---|---|---|
| 10,731,988 B1 | 8/2020 | Paniccia et al. |
| 10,969,548 B2 | 4/2021 | Paniccia et al. |
| 2004/0017974 A1 | 1/2004 | Balch et al. |
| 2004/0213536 A1 | 10/2004 | Zoorob et al. |
| 2007/0189669 A1 | 8/2007 | Tormen et al. |
| 2009/0046294 A1 | 2/2009 | Kaplan |
| 2011/0051144 A1* | 3/2011 | Wilfinger ............. G01C 21/166 73/504.08 |
| 2015/0286006 A1 | 10/2015 | Chang-Hasnain et al. |
| 2017/0199037 A1 | 7/2017 | Jain |

* cited by examiner

INTEGRATED PHOTONICS OPTICAL GYROSCOPES WITH IMPROVED SENSITIVITY UTILIZING HIGH DENSITY SILICON NITRIDE WAVEGUIDES

RELATED APPLICATIONS

This application is a divisional of and claims the benefit of U.S. patent application Ser. No. 17/364,279, filed Jun. 30, 2021, titled "Integrated Photonics Optical Gyroscopes With Improved Sensitivity Utilizing High Density Silicon Nitride Waveguides," which claims the benefit of U.S. Provisional Patent Application No. 63/047,175, filed Jul. 1, 2020, titled "Integrated Photonics Optical Gyroscopes With Improved Sensitivity Utilizing High Density Silicon Nitride Waveguides," the entirety of which is incorporated herein by reference.

TECHNICAL FIELD

The present disclosure relates to various structures and fabrication methods for integrated photonics-based optical gyroscopes utilizing high-density silicon nitride waveguides.

BACKGROUND

Gyroscopes (also referred to in short as "gyros") are devices that can sense angular velocity. The applications of gyroscopes include, but are not limited to, military, aircraft navigation, robotics, autonomous vehicles, virtual reality, augmented reality, gaming etc. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil. This path length difference is expressed as a phase difference (referred to as "phase signal") between two counter-rotating beams.

Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro,
A=area enclosed
$\Omega$=angular rotation velocity
$\Delta\phi$=optical phase difference signal
$\lambda$=wavelength of light
c=speed of light Fiber-based gyroscopes can provide very high precision, but at the same time, they are of larger footprint, are very expensive, and are hard to assemble due to the devices being built based on discrete optical components that need to be aligned precisely. Often, manual alignment is involved, which is hard to scale up for volume production.

Present inventors propose replacing fibers with waveguide based integrated photonics components for cost-effective easy integration on a semiconductor platform which is much more promising for volume production of gyroscopes. This application describes various structures including silicon nitride (SiN) waveguide cores fabricated on a silicon platform, as elaborated below. The SiN waveguide cores disclosed here can be packed at a higher density than the state-of-the-art devices because of structural modifications achieved by novel fabrication techniques.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to configurations of compact ultra-low loss integrated photonics-based waveguides with large scale manufacturing in view. These waveguides can be used as optical elements on a planar photonic integrated circuit (PIC), for example, in photonics integrated optical gyroscopes. As discussed in the background section, the key to fiber-based optical gyroscopes' high performance is the long length of high quality, low loss, optical fiber that is used to measure the Sagnac effect. The present inventors recognize that with the advent of integrated silicon photonics suitable for wafer scale processing, there is an opportunity to replace FOGs with smaller integrated photonic chip solutions without sacrificing performance. Photonics based optical gyros have reduced size, weight, power and cost, but in addition can be mass produced in high volume, are immune to vibration and have the potential to offer performances equivalent to FOGs. When integrated optical gyroscope is fabricated on a silicon platform, it is abbreviated as SiPhOG® (Silicon Photonics Optical Gyroscope).

One key element of this integrated photonic solution is to produce very low loss waveguide core made of silicon nitride ($Si_3N_4$) surrounded by oxide or fused silica claddings. The whole waveguide structure (including core and cladding) is sometimes referred to as SiN waveguide for simplicity. The propagation loss in the SiN waveguides can be well below 0.1 db/meter. This is a vast improvement over the current state-of-the-art SiN process with propagation loss in the range of 0.1 db/centimeter.

Figure 1:
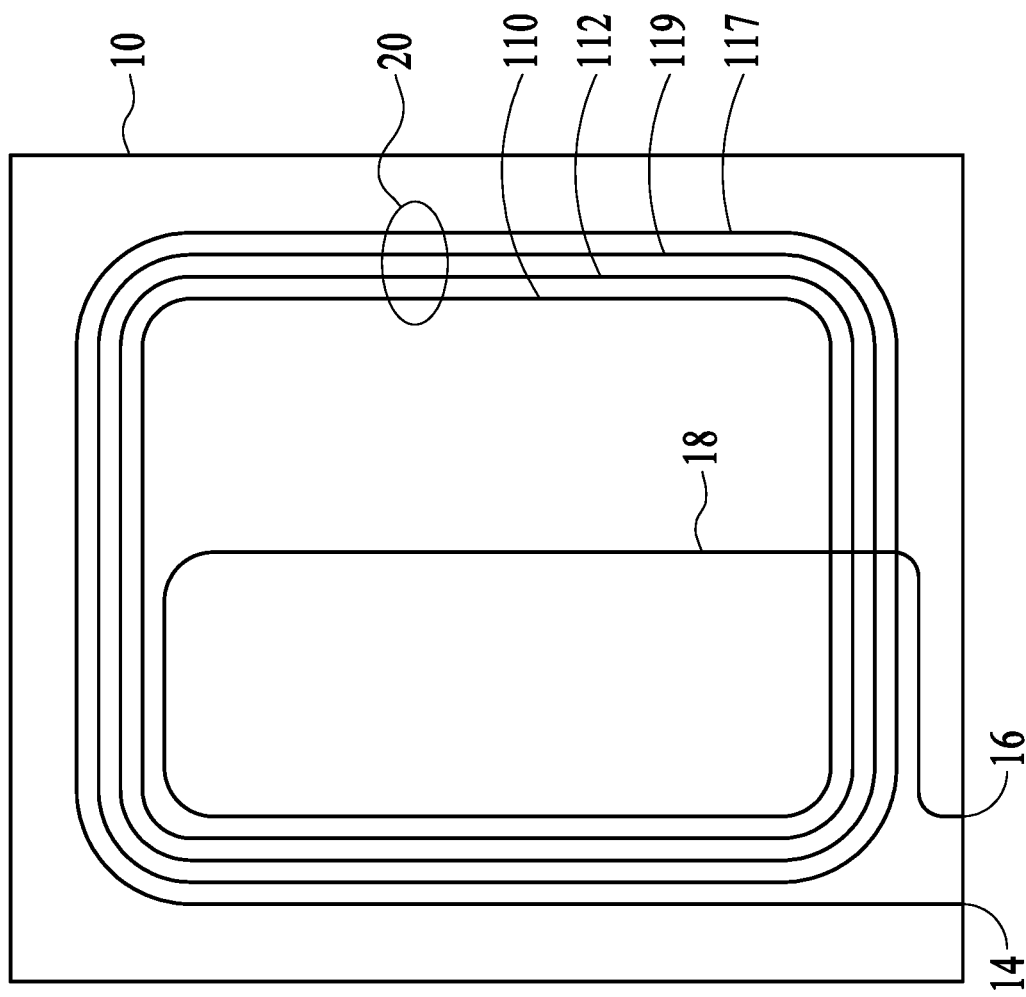
FIG. 1 is a schematic top view of a complete reticle field for an optical gyroscope coil with multiple turns, according to an embodiment of the present disclosure.

FIG. 1 shows a SiPhOG® system 100 fabricated on a waveguide die 10. Light is launched at a first end 14 of a waveguide coil 20 with several turns. Here only four turns 110, 112, 119 and 117 are shown for clarity, though in a real device, many more turns (for example, several hundreds of turns) can be used, based on the required sensitivity of the gyroscope. After propagating in the waveguide coil, light comes out from a second end 16. Note that since light can be launched from either end 14 or 16, each of the ends can act as an "input" end or an "output end". For simplicity, we refer to first end 14 as "input end" and second end 16 as "output end", and refer to the portion 18 of the waveguide closer to the second end 16 as "output waveguide" 18. In some embodiments, light can be launched at both ends 14 and 16 to obtain phase difference signal from counter-propagating light beams. Waveguide coil design needs to take into account phase interference between counter-propagating beams and/or cross-coupling between adjacent waveguides, such as between 110 and 112, or 112 and 119, or 119 and 117.

One option can be distributing the total length of a SiN waveguide coil with multiple turns (and/or a ring with a single turn) into different vertically separated layers (e.g., two or more layers) that would lead to improved gyro sensitivity without increasing the form factor. Details of a stacked multi-layer gyro configuration are covered in provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. A third provisional application 62/986,379, titled, "Process Flow for Fabricating Integrated Photonics Optical Gyroscopes," was filed on Mar. 6, 2020. These three applications were combined into a non-provisional application Ser. No. 16/894,120 filed on Jun. 5, 2020, titled "Single-layer and Multi-layer Structures for Integrated Silicon Photonics Optical Gyroscopes" which eventually issued as U.S. Pat. No. 10,969,548 on Apr. 6, 2021. These applications are incorporated herein by reference. In addition, system-level integration of a silicon photonics based front-end chip and a SiN waveguide chip have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." These two applications were combined into a non-provisional application Ser. No. 16/659,424 filed on Oct. 21, 2019, titled "System Architecture for Silicon Photonics Optical Gyroscopes" which eventually issued as U.S. Pat. No. 10,731,988 on Aug. 4, 2020. These applications are also incorporated herein by reference.

However, in the above applications, the need to manufacture a two-layer device arose partly because in a single plane, the adjacent waveguides need to be spaced apart at a pitch that prevents unwanted cross-coupling. Therefore, to keep the footprint of the device more or less same, the total length of the waveguide spiral was distributed between more than one planes. This present disclosure proposes solutions where adjacent waveguides can be packed more tightly in a single plane, i.e. the pitch between adjacent waveguides is reduced in an individual plane. Note that the terms "layer" and "plane" have been used interchangeably. Densely packing waveguides on a single plane may obviate the need to fabricate a multi-layer device altogether, or at least can reduce the number of layers necessary to get a suitable total length of waveguide, as explained below.

It is known that the sensitivity of an interferometric fiber-optical gyroscope (IFOG) depends on a product of the total length of fiber ('L') and the diameter 'D' of a circular area of the loop enclosed by turns of the fiber coil. This is often referred to as the "L*D product". Note that the enclosed area does not have to be circular, and can be rectangular (as shown in FIG.1) or any other shape suitable to harness the required performance while utilizing the area on a mask efficiently. So the term "L*D product" is generic to reflect geometry-dependence of gyro sensitivity. The same geometry-dependence analogy applies to a small-footprint SiPhOG®. The size limitation in a fiber-based system is the diameter of the fiber, which is governed by the size of the fiber core and the cladding around it. Similarly, the size limitation in SiPhOG® is determined by the spacing between adjacent cores or the waveguides and the cladding around each core. While L*D product applies to normal fiber gyros, in SiPhOG one can directly calculate the sum total of enclosed area for every loop for a multi-turn waveguide coil shown in FIG. 1.

Another factor in planar photonic devices is the limitation of die size that is dictated by the lithography equipment that is used in the fabrication process. For example, in the state-of-the-art process flows, a stepper tool that has a reticle field size of approximately 26 mm×33 mm, which gives a total waveguide length (including all the turns 20 of the waveguide coil) of approximately 20 m when a pitch (such as p1 in FIG. 3) of 22 um is used to avoid crosstalk. In order to increase the "L.D product", a tighter pitch can be used, which increases the chance of crosstalk. Alternatively, multiple reticle field can be stitched together, which increases manufacturing complexity, especially if stitching introduces waveguide misalignment.

Figure 2:
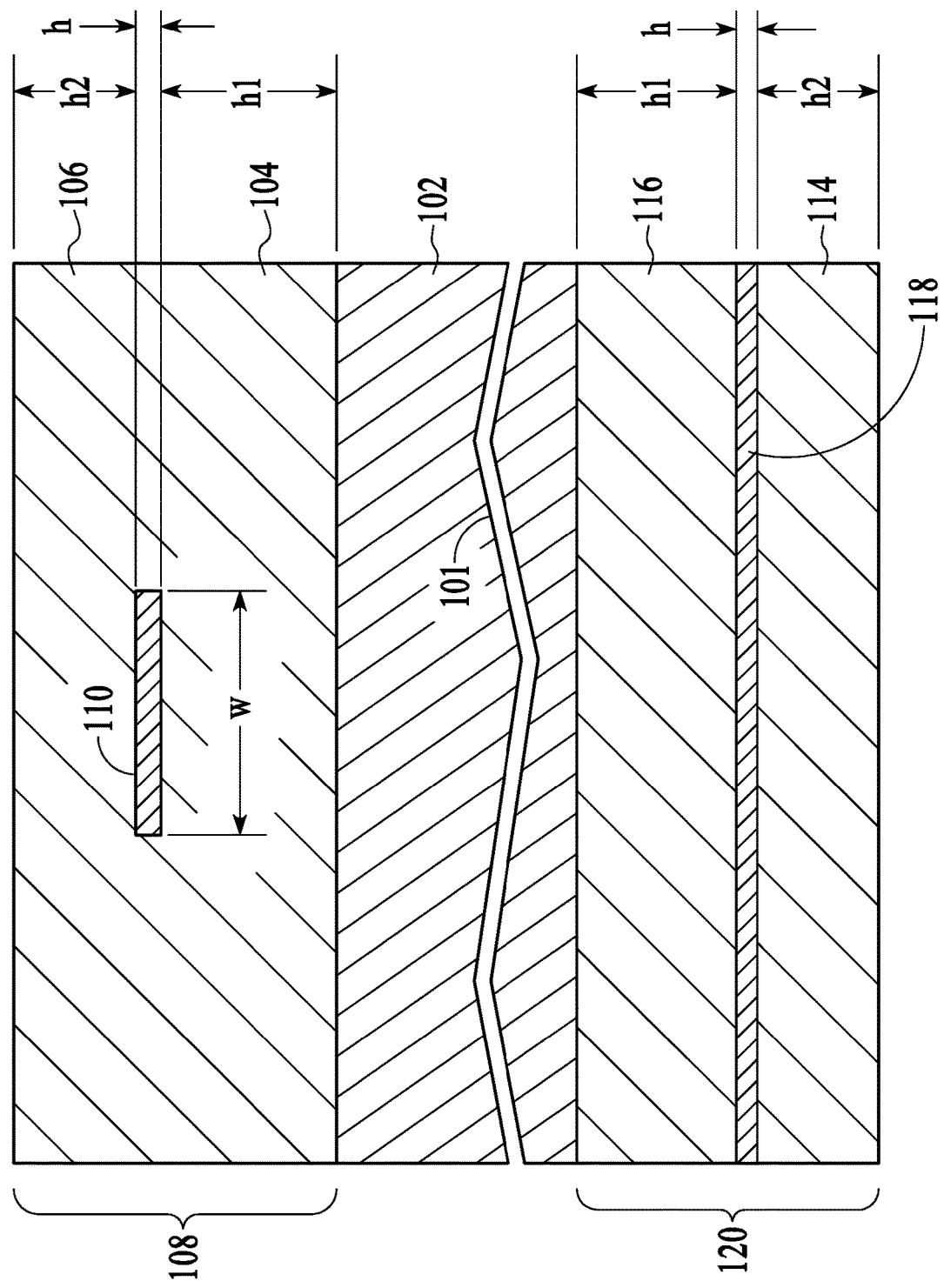
FIG. 2 is schematic cross-sectional view of a silicon nitride (SiN) waveguide core sandwiched between an upper cladding and a lower cladding, according to an embodiment of the present disclosure.

FIG. 2 shows a SiN waveguide core fabricated on a conventional silicon substrate using one reticle field, i.e. no stitching is involved. Specifically, FIG. 2 shows a substrate 102, which may be a silicon substrate. The substrate 102 may have a thickness of a standard wafer, e.g., the thickness can be 725 um. Note that the thickness of different material layers are not drawn to scale. However, in order to convey the idea that the substrate 102 is much thicker than the rest of the material layers shown in the FIGS. 2-6, the discontinuity 101 is introduced in the middle of the layer 102 just for visualization. The layers 104 and 116 can have a thickness 'h1' in the range of 15 um on both sides of the substrate 102. Layer 104 acts as a lower cladding for the waveguide core 110. Waveguide core 110 can be thought of one turn of the waveguide coil 20 shown in FIG. 1. Waveguide core 110 can have a thickness 'h' and width 'w'. Non-limiting exemplary dimensions for 'h' can be 60-100 nm, and 'w' can be 2-3 um. Waveguide core 110 is made of silicon nitride (SiN). An upper cladding 106 is formed on top of waveguide core 110. The thickness 'h2' of the upper cladding layer 106 can be in the range of 2-3 um. Note that when layers 104, 110 and 106 are formed on one side of substrate 102, corresponding layers 116, 118 and 114 are also formed on the other side of the substrate 102, even though those layers are not used for waveguiding purposes. Alternatively, those layers can create waveguides in a different layer, if necessary. Both upper and lower claddings 104 and 106 are shown to be of the same material 108, e.g. silicon oxide, though in various embodiments, the lower cladding can be pre-grown oxide and the upper cladding may be deposited oxide, such as TEOS (Tetra Ethyl Ortho Silicate) or other composition. Similarly both layers 114 and 116 have the same material 120 which is identical to material 108.

Figure 3:
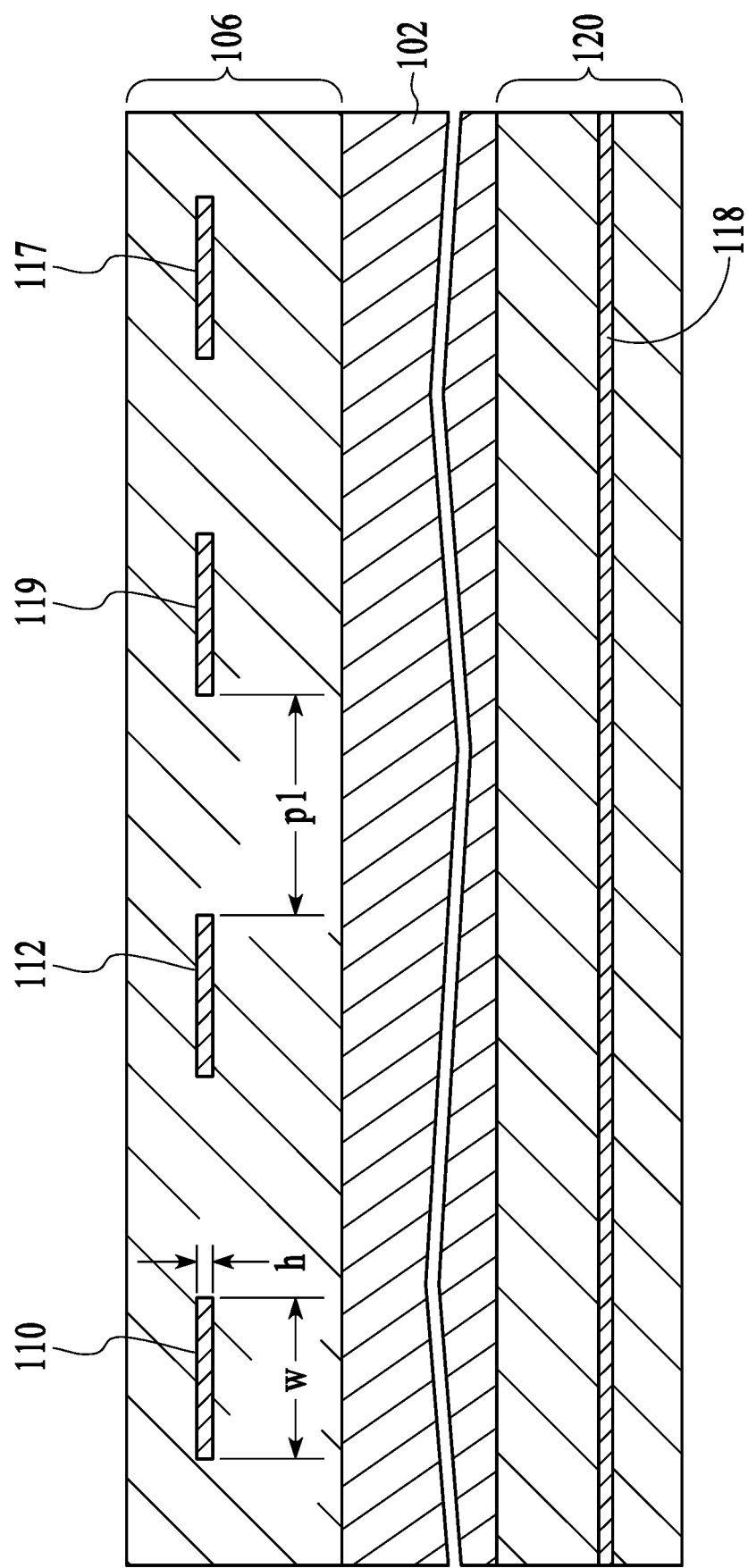
FIG. 3 is a schematic cross-sectional view showing regular pitch between adjacent silicon nitride (SiN) waveguide cores to avoid crosstalk, according to an embodiment of the present disclosure.

FIG. 3 shows adjacent waveguide cores 110, 112, 119 and 117 corresponding to each turn of the waveguide coil 20 shown in FIG. 1. To maintain single mode and to avoid coupling between adjacent waveguides, a minimum pitch p1 needs to be maintained. A non-limiting example value of p1 can be 14-16 um. This pitch limits the total serial length of the waveguide on a die 10 (see FIG. 1), and therefore the maximum area enclosed by the waveguide coil 20 is also limited. Thus the "L.D product" of the integrated optical gyroscope is limited by die size and lithography limitations if stitching is to be avoided.

Figure 4:
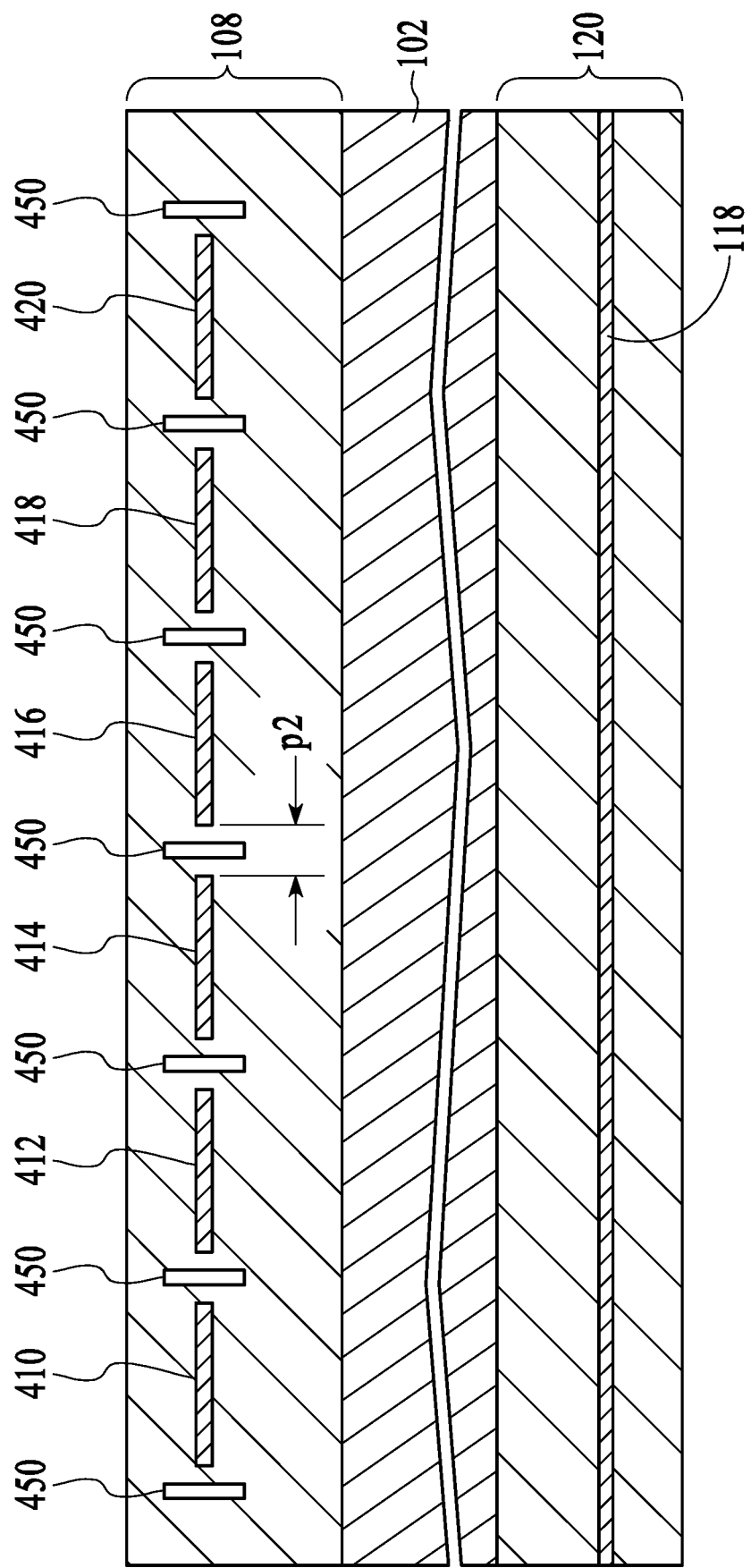
FIG. 4 is a schematic cross-sectional view showing a first embodiment with air-gaps between adjacent silicon nitride (SiN) waveguide cores to increase density without increasing crosstalk, according to an embodiment of the present disclosure.

FIG. 4 shows one approach to mitigating the crosstalk between adjacent waveguides while making the pitch shorter, thereby being able to more densely pack the turns of the waveguide coil 20. The embodiment in FIG. 4 automatically leads to longer total length of the waveguide and a larger enclosed area, i.e. a higher L*D product that translates to higher sensitivity. Introducing air gaps 450 on both sides of the waveguide core confines optical modes largely within the waveguide and prevents leakage of optical signal to the adjacent waveguide. In other words, the air gaps 450 act as physical isolations between adjacent waveguide cores 410, 412, 414, 416, 418 and 420. As the pitch p2 between two adjacent waveguide cores reduces, automatically more turns can be accommodated within the same reticle field, increasing both the total length and the enclosed area in every layer. The pitch p2 can very well be less than 10 um with the air gaps, i.e. much lower than the pitch p1 shown in FIG. 3. Note that instead of air, the gaps may be filled with other non-reactive fluid, such as an inert gas.

Figure 5:
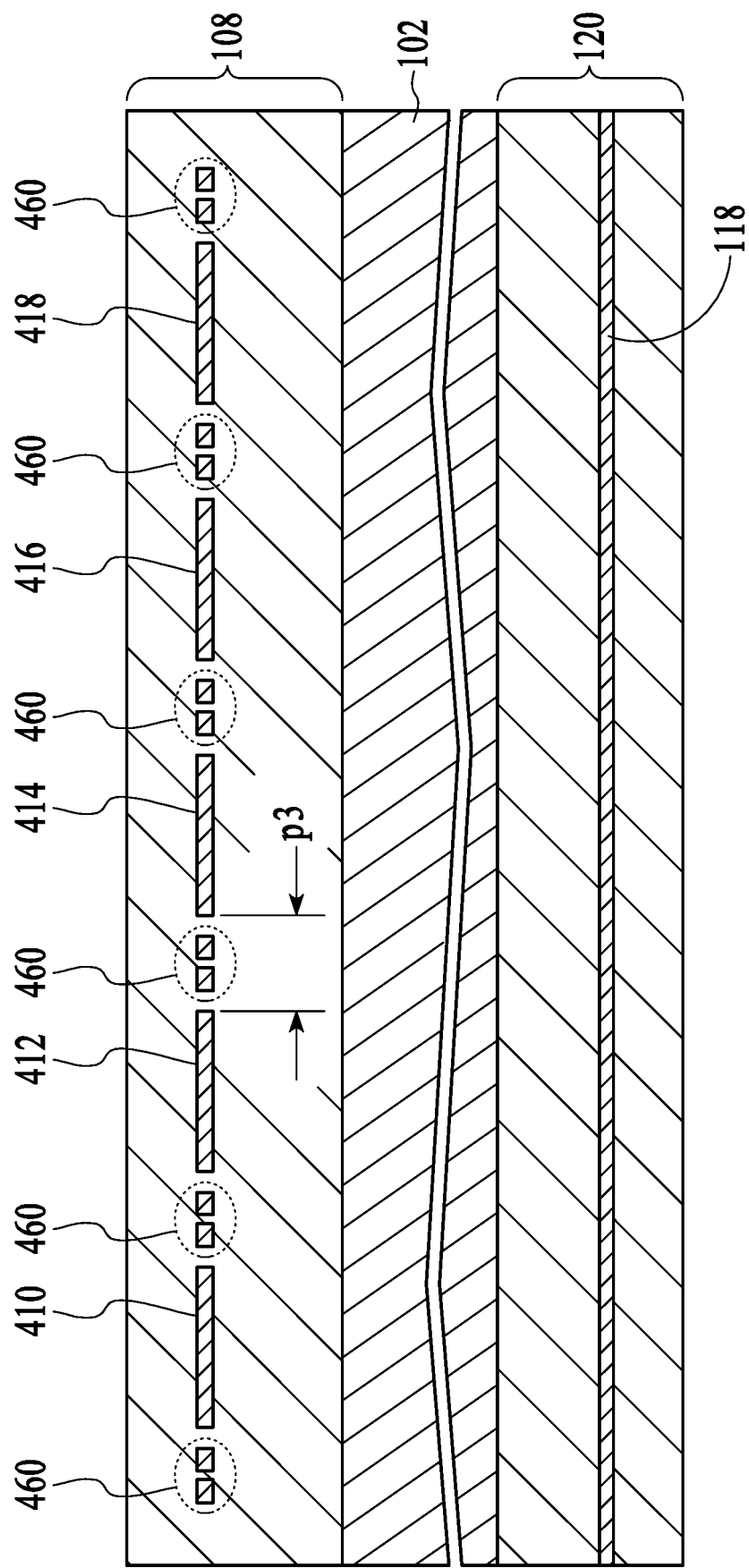
FIG. 5 is a schematic cross-sectional view showing a first embodiment with sub-wavelength grating-like structures between adjacent silicon nitride (SiN) waveguide cores to increase density without increasing crosstalk, according to an embodiment of the present disclosure.

FIG. 5 shows another structural modification for mitigating the crosstalk between adjacent waveguides. In the embodiment shown in FIG. 5, sub-wavelength structures (similar to gratings) 460 are introduced in between any two adjacent waveguide cores 410, 412, 414, 416 and 418. The sub-wavelength structures 460 are customized based on the wavelength of the light beam propagating with the waveguide. The sub-wavelength structures 460 essentially prevent cross-coupling between adjacent waveguides by destructive interference. This is achieved by creating periodic pattern of trenches on either side of the waveguide cores in the silicon nitride layer, providing anti-resonant functionalities. The trenches may be filled with air or certain other non-reactive fluid, such as an inert gas. The pitch p3 for this configuration is much lower than the pitch p1 shown in FIG. 3. Note that to improve the efficacy of the destructive interference, in some embodiments, the trenches (i.e. the grating like periodic structures) can be extended into the cladding layers rather than being restricted to the waveguide core layer only. In other words, the sub-wavelength structures are deep-etched into the cladding using the same type of etch as the air-gaps described in FIG. 4. This would be similar to a photonic crystal, where a bandgap is formed. Creating the photonic crystal like periodic structure requires highly vertical and high-selectivity etch, although the pitch does not have to be as tight as a typical photonic crystal, since the momentum vector of the light that is attempted to be suppressed is much smaller.

Figure 6:
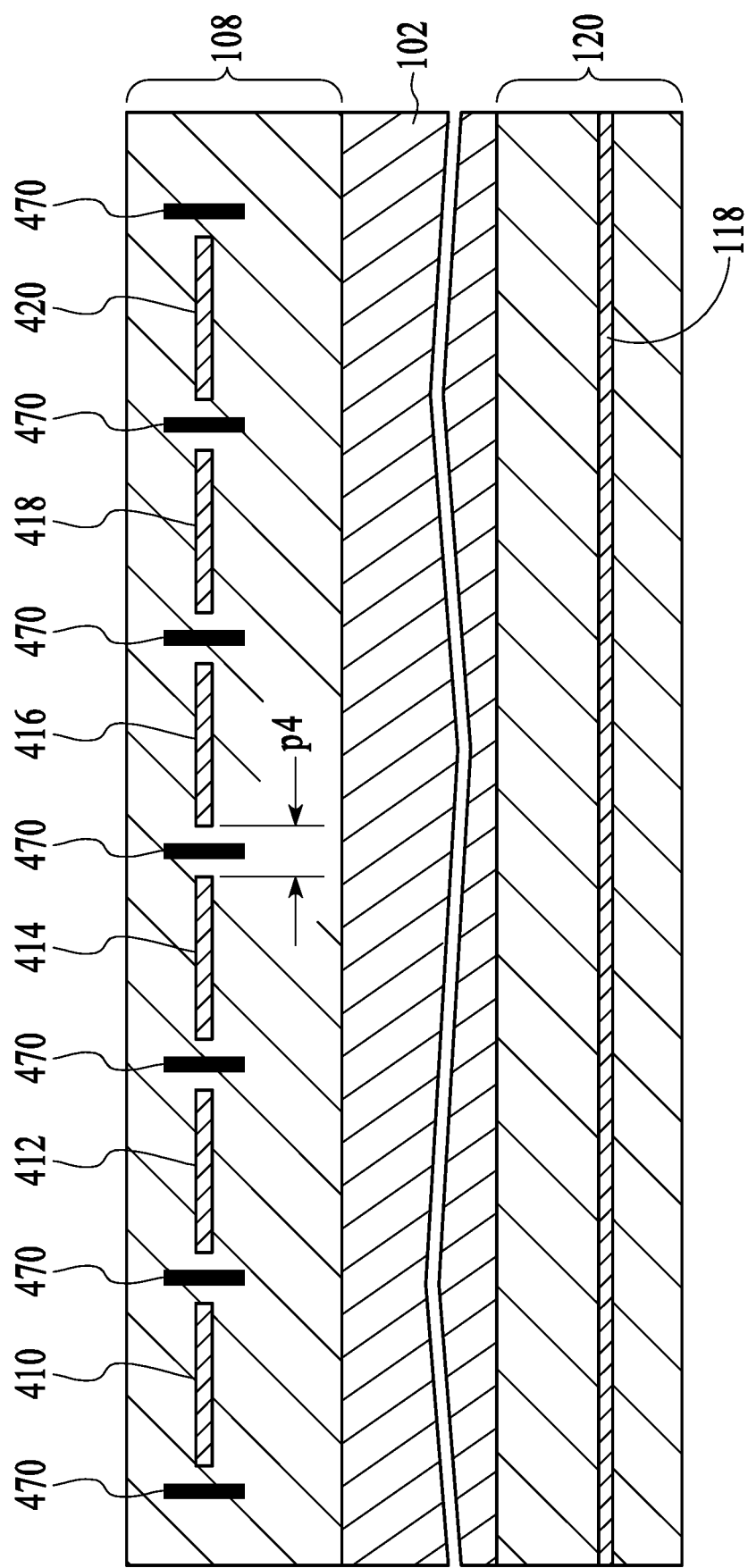
FIG. 6 is a schematic cross-sectional view showing a first embodiment with metal barriers between adjacent silicon nitride (SiN) waveguide cores to increase density without increasing crosstalk, according to an embodiment of the present disclosure.

FIG. 6 shows yet another structural modification to mitigate the crosstalk between adjacent waveguides. This embodiment is quite similar to the embodiment in FIG. 4, the difference being that instead of air gaps, metallic barriers 470 are formed in between adjacent waveguide cores 410, 412, 414, 416, 418 and 420. The purpose of the metal barriers 470 is similar to the air gaps 450, i.e. to confine the modes to the respective waveguide cores. The pitch p4 in the embodiment shown in FIG. 6 is much lower than the pitch p1 shown in FIG. 3.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An integrated photonics chip comprising:
a waveguide coil enclosing a central area, wherein the waveguide coil comprises a plurality of waveguide turns looping around the central area, and each waveguide turn is parallel to adjacent waveguide turns; and
a structural modification introduced on either side of each waveguide turn to reduce a pitch between the adjacent waveguide turns without increasing crosstalk between the adjacent waveguide turns, wherein each waveguide turn comprises a waveguide core surrounded by a cladding material, wherein the structural modification comprises a discontinuity in the cladding material.

2. The integrated photonics chip of claim 1, wherein reducing the pitch between the adjacent waveguide turns increases a total number of waveguide turns that can be fabricated within a predetermined area of the integrated photonics chip, wherein the predetermined area includes the waveguide coil and the central area enclosed by the waveguide coil.

3. The integrated photonics chip of claim 2, wherein the predetermined area depends on an exposure field of a reticle used to fabricate the waveguide coil with the plurality of turns.

4. The integrated photonics chip of claim 1, wherein the waveguide coil is used as a rotational sensing element of an optical gyroscope.

5. The integrated photonics chip of claim 4, wherein a sensitivity of the rotational sensing element depends on a total number of waveguide turns in the waveguide coil as well as on the area of the central area enclosed by the waveguide coil.

6. The integrated photonics chip of claim 1, wherein the waveguide core comprises silicon nitride and the cladding material comprises oxide.

7. The integrated photonics chip of claim 1, wherein the structural modification comprises a sub-wavelength structure introduced between the adjacent waveguide turns.

8. The integrated photonics chip of claim 7, wherein the sub-wavelength structure comprises a grating.

9. The integrated photonics chip of claim 8, wherein a periodicity of the grating depends on a wavelength of light propagating within the waveguide coil.

10. The integrated photonics chip of claim 8, wherein the grating prevents cross-coupling between adjacent waveguides by destructive interference.

11. The integrated photonics chip of claim 8, wherein the grating comprises a periodic pattern of trenches.

12. The integrated photonics chip of claim 11, wherein the trenches contain a non-reactive liquid or gas.

13. The integrated photonics chip of claim 11, wherein the trenches contain air.

14. The integrated photonics chip of claim 11, wherein the trenches contain metal deposited inside.

15. The integrated photonics chip of claim 11, wherein the sub-wavelength structure comprises a structure representing a photonic crystal, with periodic trenches deep-etched through an upper portion of the cladding material past the waveguide core and extending deep into a lower portion of the cladding material in a longitudinal direction.

* * * * *